(No Model.)  2 Sheets—Sheet 2.

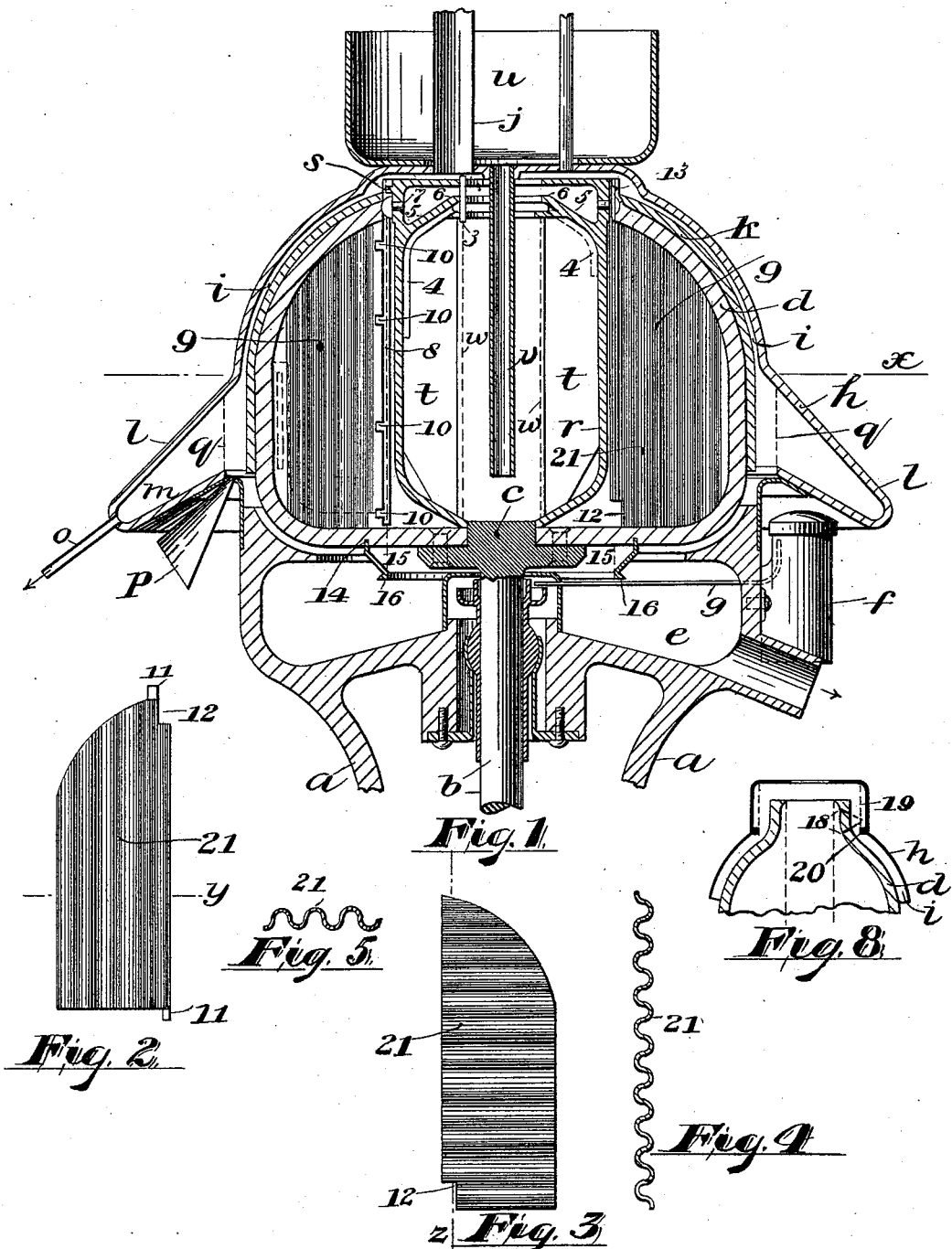

O. OHLSSON.
CENTRIFUGAL BUTTER EXTRACTOR.

No. 528,682.  Patented Nov. 6, 1894.

Witnesses  Inventor
Oscar O. Michel  Olof Ohlsson,
W. N. Garrabrants  By Draker & Co. Att'ys.

THE NORRIS PETERS CO., PHOTO-LITHO., WASHINGTON, D. C.

UNITED STATES PATENT OFFICE.

OLOF OHLSSON, OF NEWARK, NEW JERSEY, ASSIGNOR TO THE UNITED STATES BUTTER EXTRACTOR COMPANY, OF NEW JERSEY.

CENTRIFUGAL BUTTER-EXTRACTOR.

SPECIFICATION forming part of Letters Patent No. 528,682, dated November 6, 1894.

Application filed July 9, 1892. Serial No. 439,516. (No model.)

*To all whom it may concern:*

Be it known that I, OLOF OHLSSON, a subject of the King of Sweden and Norway, residing at Newark, in the county of Essex and State of New Jersey, have invented certain new and useful Improvements in Butter Separators or Extractors; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This invention relates to that class of butter making machines shown and described in Patent No. 508,744, dated November 14, 1893, the presently described device presenting specific forms of construction which are of special advantage under certain conditions. Many of the detail features of this construction may be employed in connection, or in lieu of those shown in said contemporaneous application.

Some of the objects of the invention are to secure a more certain and perfect separation of the cream from the milk, to obtain a better quality thereof, to purify the milk before allowing it to enter the main separating chamber, the dirt being separated from said milk prior to its entrance to said main separating chamber and thus prevented from clogging the small milk passages and interfering with the proper operations of the machine, to deliver the milk to the main separating chamber at various heights therein, the milk issuing in small quantities at each opening in the supply pipe, and to thus secure a more even distribution and a slower movement of the milk through the machine, and to secure other advantages and results some of which will be referred to in connection with the description of the working parts.

Figure 6:
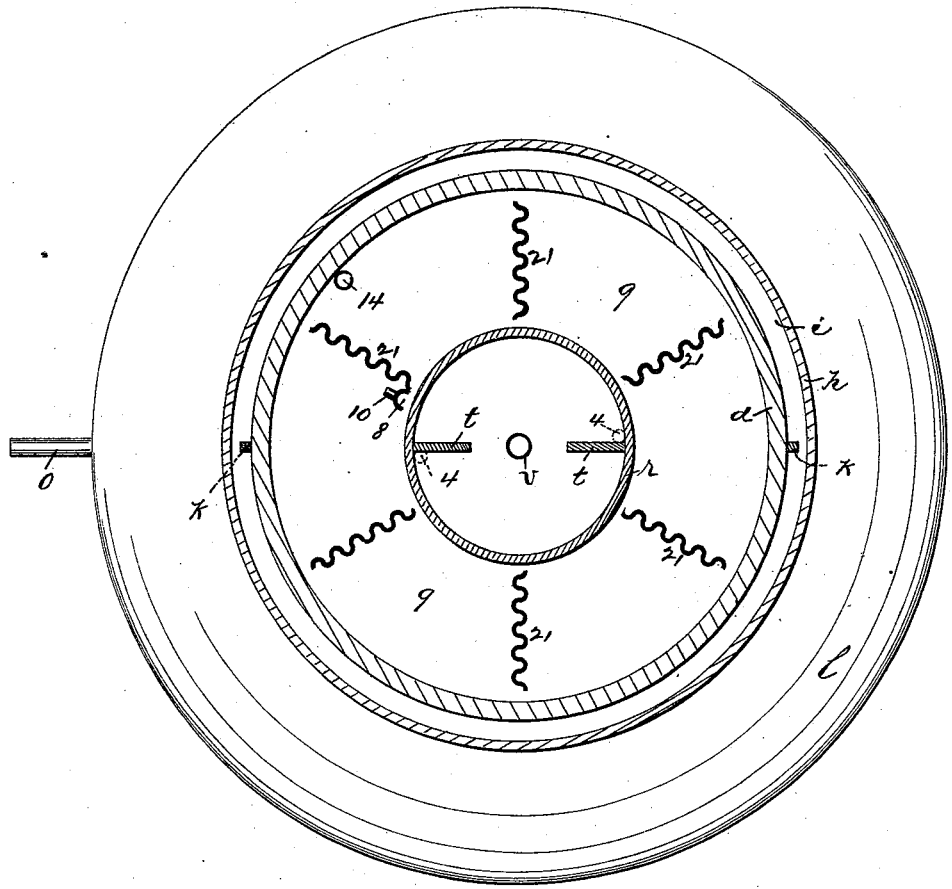
Figure 7:
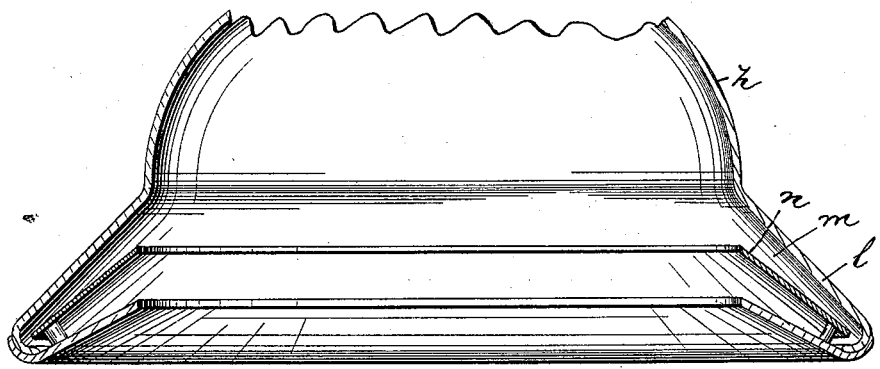

Referring to the accompanying drawings, in which like letters and numerals indicate corresponding parts in each of the figures, Figure 1 is a central vertical section of the improved butter making machine. Figs. 2, 3, 4 and 5 are plans of certain wings in detail and sections of the same on lines *y* and *z*. Fig. 6 is a horizontal section taken on line *x*, Fig. 1, and Fig. 7 is a sectional detail showing a variety or modification in the construction of a butter separating chamber. Fig. 8 illustrates a modification in the construction of that portion of the machine in which the separated cream is transmitted to the butter separating chamber.

In said drawings, *a* indicates a bed casting providing bearings for a central rotary shaft, *b*, upon the upper seat, *c*, of which the rotary centrifugal bowl, *d*, is secured. The said bed casting is provided with a skim milk chamber, *e*, an oil cup, *f*, and pipe, *g*, leading to the central bearings, and, at its upper edge, is provided with a rim upon which a peculiar cover, *h*, is held, the said cover forming, between it and the outer circumference of the bowl, a peripheral chamber, *i*, to receive cold air from a cold air duct, *j*, the said air being forced to enter said chamber from any suitable refrigerator by means of the rapidly rotating wings, *k*, formed on the surface of the bowl. The large friction surface of the bowl, however, will ordinarily produce sufficient suction to enable me to dispense with the said wings. The lower part of the cover, closely adjacent to the rim, is enlarged, as at *l*, to form a butter separating chamber, *m*, to receive the mixed butter and buttermilk for the cooling chamber, and separate the same by centrifugal force induced by the friction of the air working on the body of liquid in said chamber. Said chamber, *m*, is preferably subdivided by a partition, *n*, Fig. 7, to facilitate the separation of butter. From said chamber is a suitable buttermilk exit *o*, and a butter outlet, *p*, the former communicating with the outer periphery of the chamber and the latter with the said chamber at the butter wall, *q*, therein.

Within the main chamber formed beneath the cover, *h*, is the rotary bowl, *d*, before referred to. This is of forged steel and is provided with an interior bowl or receptacle *r*, which is removable from the main bowl to admit of an easy cleaning of the interior, but is held in place by pins, *s*, Fig. 1, working in bayonet joint slots as will be understood. Said inner receptacle is provided with wings, *t*, to give rotary movement to the milk and separate the more easily separable particles of cream from the milk and the heavier particles of dirt from said milk before the latter enters the main separating chamber, said particles of dirt being retained in said receptacle, r, and being prevented from entering the larger separating chamber where the "close" work of cream separating is performed. The milk is received into this receptacle from the tank, u, through the tube v, at a rather high temperature, just about that of the factory, say from 75° to 85° Fahrenheit, and is given the comparatively slow rotation by the wings t, t, which cause the separation of the heavier particles of dirt and the easily separated particles of cream. This cream lying at the inner cream wall, w, passes out immediately through the duct, 3, to the cold air chamber, i, where it is reduced in temperature to say 55° or 60° at which temperature there is an easy separation of butter from the cream. The bulk of the milk, however, passes out through the tubes or ducts, 4, over the inwardly extending partition, 5, through suitable ducts or passages 6 and 7 into a vertical duct or passage, 8, in the outer separating chamber 9. Said duct is provided at various points in its vertical length with outlets 10, 10, which distributes the milk, in small quantities over the vertical surface of the separating chamber. Within this main chamber 9, the centrifugal force is materially greater, and the milk relieved of the more easily separated particles of cream is brought under stronger separating force and the less easily separable particles of cream are separated without the disadvantage of subjecting them to the heavier force. Thus the undesirable effect known in the art as "over-separation" is avoided.

Means are provided for securing a prolonged flow of the milk through the chamber, some of which have been described in my prior application before referred to. I have found additional advantage in corrugating the wings, 21, as shown in the second, third, fourth, and fifth figures of the drawings and thus securing additional wing surface.

I prefer to arrange the wings, 21, removably within the main chamber, 9, by forming pins or lugs, 11, at the opposite ends of said wings at their inner edges. Said pins or lugs enter suitable recesses in the upper and lower walls of the bowl. After a simple insertion of said pins or lugs in said recesses, the wings are held in place, during the operation of the machine, by centrifugal force. The cream passages, 12, are as heretofore described, but by having a loose fit of the wings against the sides of the bowl, need for special skim milk passages is avoided.

The cream from the main chamber passes through the passage, 13, into the cooling chamber i, where the butter is separated from the buttermilk. The skim milk passes out through the tube, 14, to a skim milk chamber, 15, where it forms an annular body of skim milk, the wall of which coincides with the cream wall 12, of the main chamber. The annular overflow-edge, 16, coincides with the tube 13 and as the edges are extended in length, the change in feed does not affect to any considerable degree, the proportion of cream obtained from the milk and the quality of the butter.

In directing the separated cream to the butter chamber, I prefer the construction shown in Fig. 8, where the upper part of the bowl is provided with cream exits 18 formed at angles to each other so as to direct the two streams or jets of cream into contact as indicated in dotted outline, to break to some extend the outward force. This outward movement is also cushioned by forming a cream wall, 19, adjacent to said exits, by means of the raised ridge, 20, at the inside wall of the cover.

Having thus described the invention, what I claim as new is—

1. In a centrifugal creamer and butter machine, a rotary cream separating bowl having inner and outer cream separating chambers with cream exits from each, and a milk passage leading from the inner to the outer chamber and means for delivering the milk to the outer chamber at different heights, substantially as set forth.

2. In a centrifugal creamer and butter making machine, a rotary cream separating bowl having inner and outer cream separating chambers, each provided with wings and milk inlets and skim milk exits, a milk tank provided with a passage leading into the inner or central separating chamber substantially as set forth.

3. In combination with a rotary bowl having inner and outer separating chambers, a vertical feed channel or duct, 8, arranged in the outer chamber and having a series of openings, 10, therein, and a passage 4, 6, and 7 leading from the inner chamber to said vertical channel or duct, substantially as set forth.

4. In combination with a rotary bowl having two cream separating chambers, a stationary cover having a butter separating chamber with said bowl and two ducts or passages admitting the flow of cream from the cream separating chambers to said butter separating chamber substantially as set forth.

5. In combination with a centrifugal cream separator, a cold air chamber stationed around said cream separator, a cold air duct leading to said chamber, the cold air being drawn into said chamber through said duct by the suction induced by the rotary separator and ducts or passages for leading the cream into said chamber, and ducts or passages for leading the butter and butter-milk from said chamber, substantially as set forth.

6. In combination with the cream separating bowl, exit passages from said bowl, formed at angles to one another and adapted to direct the outwardly issuing streams or jets of cream against one another to break their outward force, substantially as set forth.

7. In combination with the cream separating bowl, exit passages from said bowl and a cream holding chamber provided with a receptacle adapted to receive the outwardly issuing cream and adapted to form a cream wall adjacent to said exits against which cream wall the cream is impelled by centrifugal force substantially as set forth.

In testimony that I claim the foregoing I have hereunto set my hand this 30th day of June, 1892.

OLOF OHLSSON.

Witnesses:
CHARLES H. PELL,
OSCAR A. MICHEL.